US007716049B2

(12) United States Patent
Tian

(10) Patent No.: US 7,716,049 B2
(45) Date of Patent: May 11, 2010

(54) METHOD, APPARATUS AND COMPUTER PROGRAM PRODUCT FOR PROVIDING ADAPTIVE LANGUAGE MODEL SCALING

(75) Inventor: Jilei Tian, Tamere (FI)

(73) Assignee: Nokia Corporation, Espoo (FI)

( * ) Notice: Subject to any disclaimer, the term of this patent is extended or adjusted under 35 U.S.C. 154(b) by 752 days.

(21) Appl. No.: 11/427,954

(22) Filed: Jun. 30, 2006

(65) Prior Publication Data
US 2008/0004877 A1 Jan. 3, 2008

(51) Int. Cl.
*G10L 15/04* (2006.01)
*G10L 15/06* (2006.01)
*G10L 15/18* (2006.01)

(52) U.S. Cl. .................. 704/251; 704/231; 704/244; 704/252; 704/257

(58) Field of Classification Search .................. None
See application file for complete search history.

(56) References Cited

U.S. PATENT DOCUMENTS

| | | | | |
|---|---|---|---|---|
| 5,027,406 A | * | 6/1991 | Roberts et al. ............. | 704/244 |
| 5,852,801 A | * | 12/1998 | Hon et al. .................. | 704/244 |
| 6,272,462 B1 | * | 8/2001 | Nguyen et al. ............. | 704/244 |
| 6,356,865 B1 | * | 3/2002 | Franz et al. ................ | 704/2 |
| 6,499,011 B1 | * | 12/2002 | Souvignier et al. ......... | 704/240 |
| 6,856,956 B2 | * | 2/2005 | Thrasher et al. ............ | 704/251 |
| 2007/0239430 A1 | * | 10/2007 | Ollason ..................... | 704/9 |

OTHER PUBLICATIONS

Huang, X. et al. "Unified stochastic engine (USE) for speech recognition" Acoustics, Speech and Signal Processing, vol. 2, 636-39, 1993.*

* cited by examiner

*Primary Examiner*—Matthew J Sked
(74) *Attorney, Agent, or Firm*—Alston & Bird LLP

(57) ABSTRACT

An apparatus for providing adaptive language model scaling includes an adaptive scaling element and an interface element. The adaptive scaling element is configured to receive input speech comprising a sequence of spoken words and to determine a plurality of candidate sequences of text words in which each of the candidate sequences has a corresponding sentence score representing a probability that a candidate sequence matches the sequence of spoken words. Each corresponding sentence score is calculated using an adaptive scaling factor. The interface element is configured to receive a user input selecting one of the candidate sequences. The adaptive scaling element is further configured to estimate an objective function based on the user input and to modify the adaptive scaling factor based on the estimated objective function.

26 Claims, 5 Drawing Sheets

METHOD, APPARATUS AND COMPUTER PROGRAM PRODUCT FOR PROVIDING ADAPTIVE LANGUAGE MODEL SCALING

TECHNOLOGICAL FIELD

Embodiments of the present invention relate generally to speech recognition technology and, more particularly, relate to a method, apparatus and computer program product for employing adaptive language model scaling in speech recognition.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In many applications, it is necessary for the user to receive audio information such as oral feedback or instructions from the network or for the user to give oral instructions or feedback to the network. Such applications may provide for a user interface that is does not rely on substantial manual user activity. In other words, the user may interact with the application in a hands free or semi-hands free environment. An example of such an application may be paying a bill, ordering a program, requesting and receiving driving instructions, etc. Other applications may convert oral speech into text or perform some other function based on recognized speech, such as dictating SMS or email, etc. In order to support these and other applications, speech recognition applications are becoming more common.

Speech recognition may be conducted by numerous different types of applications. Such applications may include a very large vocabulary for robust word recognition. However, in mobile environments where resources such as processing power, battery life, and memory capacity are limited, it becomes necessary to perform highly capable word recognition while consuming a minimum of resources.

In a typical speech recognition application such as, for example, isolated word based speech recognition, a speaker may be asked to speak with a clear pause between words in order to enable the word to be segmented by voice activity detection (VAD). VAD may be used to detect word boundaries so that speech recognition may be carried out only on a single segmented word at any given time. The n-best word candidates may then be given for each segmented word. Once the same process has been performed for each word in an utterance, a word lattice may then be produced including each of the n-best word candidates for each corresponding word of the utterance. The word candidates of the word lattice may be listed or otherwise organized in order of a score that represents a likelihood that the word candidate is the correct word. In this regard, one way of scoring the word candidates is to provide an acoustic score and a language score such as a language model (LM) n-gram value. The acoustic score is a value based on sound alone. In other words, the acoustic score represents a probability that the word candidate matches the spoken word being analyzed based only on the sound of the spoken word. Meanwhile, the language score takes into account language attributes such as grammar to determine the probability that a particular word candidate matches the spoken word being analyzed based on language probabilities accessible to the application. For example, if the first word of an utterance is "I", then the probability of the second word spoken being "is" would be very low, while the probability of the second word spoken being "am" would be much higher. It is traditional to use the term language model (LM) for the statistical n-gram models of word sequences that use the previous n-1 words to predict the next one. The n-gram LM is trained on a large text corpus.

After calculating a value for the acoustic score and the language score, a combined score may be acquired that may subsequently be used to order each of the candidate words. This process may be called an N-best search. The user may select the correct word from among each candidate, or the user may select or confirm the correct sentence from among similarly generated candidate sentences.

Combining the acoustic score and the language score is often not done via a simple summation since numerous factors may impact the accuracy of the acoustic and language scores. For example, certain acoustic models, LM models, extracted features from speech, speakers, etc., may cause an imbalance in the importance of either the acoustic score or the language score. Accordingly, there is a need to balance the relative weights of the acoustic and language scores to produce a better modeling result. In this regard, conventional modeling techniques have introduced LM scaling, which essentially applies a weighting factor to at least one of the acoustic and language scores. Conventional modeling techniques use testing data such as large portions of text in order to determine a fixed value for an LM scaling factor. However, producing the LM scaling factor by this mechanism has some drawbacks. For example, it takes a substantial amount of time to determine the LM scaling factor using the large quantities of testing data. Additionally, because the LM scaling depends of the testing data, results of speech recognition using different data, microphones, hidden Markov models (HMMs), LMs or even different speakers may skew results. Furthermore, environmental changes such as, for example, ambient noise levels or other factors may also skew results.

Accordingly, there may be need to develop a speech recognition application that overcomes the problems described above, while avoiding substantial increases in consumption of resources such as memory and power.

BRIEF SUMMARY

A method, apparatus and computer program product are therefore provided to enable efficient and adaptive language model scaling. In particular, a method, apparatus and computer program product are provided that enable the online updating of a weighting factor to be associated with either or both of the acoustic and language scores. In this regard, an objective function is defined which may be optimized in order to update the weighting factor. Contrary to conventional techniques, the optimization and updating may be performed online rather than offline before implementation of the speech recognition application. In other words, the weighting factor may be updated in response to environmental or other changes by providing updates to the value of the weighting factor in response to each use of the weighting factor. Accordingly, training and experimentation using testing data may be omitted and an adaptive language model scaling function or weighting factor may be employed to provide robust speech recognition capabilities without substantial increases in resource consumption.

In one exemplary embodiment, a method of providing adaptive language model scaling is provided. The method includes receiving input speech comprising a sequence of spoken words and determining a plurality of candidate sequences of text words in which each of the candidate sequences has a corresponding sentence score representing a probability that a candidate sequence matches the sequence of spoken words. Each corresponding sentence score is calculated using an adaptive scaling factor. The method further includes receiving a user input selecting one of the candidate sequences, estimating an objective function based on the user input, and modifying the adaptive scaling factor based on the estimated objective function.

In another exemplary embodiment, a computer program product for providing adaptive language model scaling is provided. The computer program product includes at least one computer-readable storage medium having computer-readable program code portions stored therein. The computer-readable program code portions include first, second, third, fourth and fifth executable portions. The first executable portion is for receiving input speech comprising a sequence of spoken words. The second executable portion is for determining a plurality of candidate sequences of text words in which each of the candidate sequences has a corresponding sentence score representing a probability that a candidate sequence matches the sequence of spoken words. Each corresponding sentence score is calculated using an adaptive scaling factor. The third executable portion is for receiving a user input selecting one of the candidate sequences. The fourth executable portion is for estimating an objective function based on the user input. The fifth executable portion is for modifying the adaptive scaling factor based on the estimated objective function.

In another exemplary embodiment, an apparatus for providing adaptive language model scaling is provided. The apparatus includes an adaptive scaling element and an interface element. The adaptive scaling element is configured to receive input speech comprising a sequence of spoken words and to determine a plurality of candidate sequences of text words in which each of the candidate sequences has a corresponding sentence score representing a probability that a candidate sequence matches the sequence of spoken words. Each corresponding sentence score is calculated using an adaptive scaling factor. The interface element is configured to receive a user input selecting one of the candidate sequences. The adaptive scaling element is further configured to estimate an objective function based on the user input and to modify the adaptive scaling factor based on the estimated objective function.

In another exemplary embodiment, an apparatus for providing adaptive language model scaling is provided. The apparatus includes means for receiving input speech comprising a sequence of spoken words and means for determining a plurality of candidate sequences of text words in which each of the candidate sequences has a corresponding sentence score representing a probability that a candidate sequence matches the sequence of spoken words. Each corresponding sentence score is calculated using an adaptive scaling factor. The apparatus also includes means for receiving a user input selecting one of the candidate sequences, means for estimating an objective function based on the user input, and means for modifying the adaptive scaling factor based on the estimated objective function.

Embodiments of the invention may provide a method, apparatus and computer program product for advantageous employment in a mobile electronic device environment, such as on a mobile terminal. As a result, for example, mobile terminal users may enjoy an improved speech recognition capability without the use of testing data for experimentation to determine a scaling factor. Additionally, embodiments of the present invention provide a simpler mechanism by which to implement accurate speech recognition since there is no parameter tuning and no need for additional linguistic knowledge or experience since the user provides feedback for use in updating the scaling factor online or during operation.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
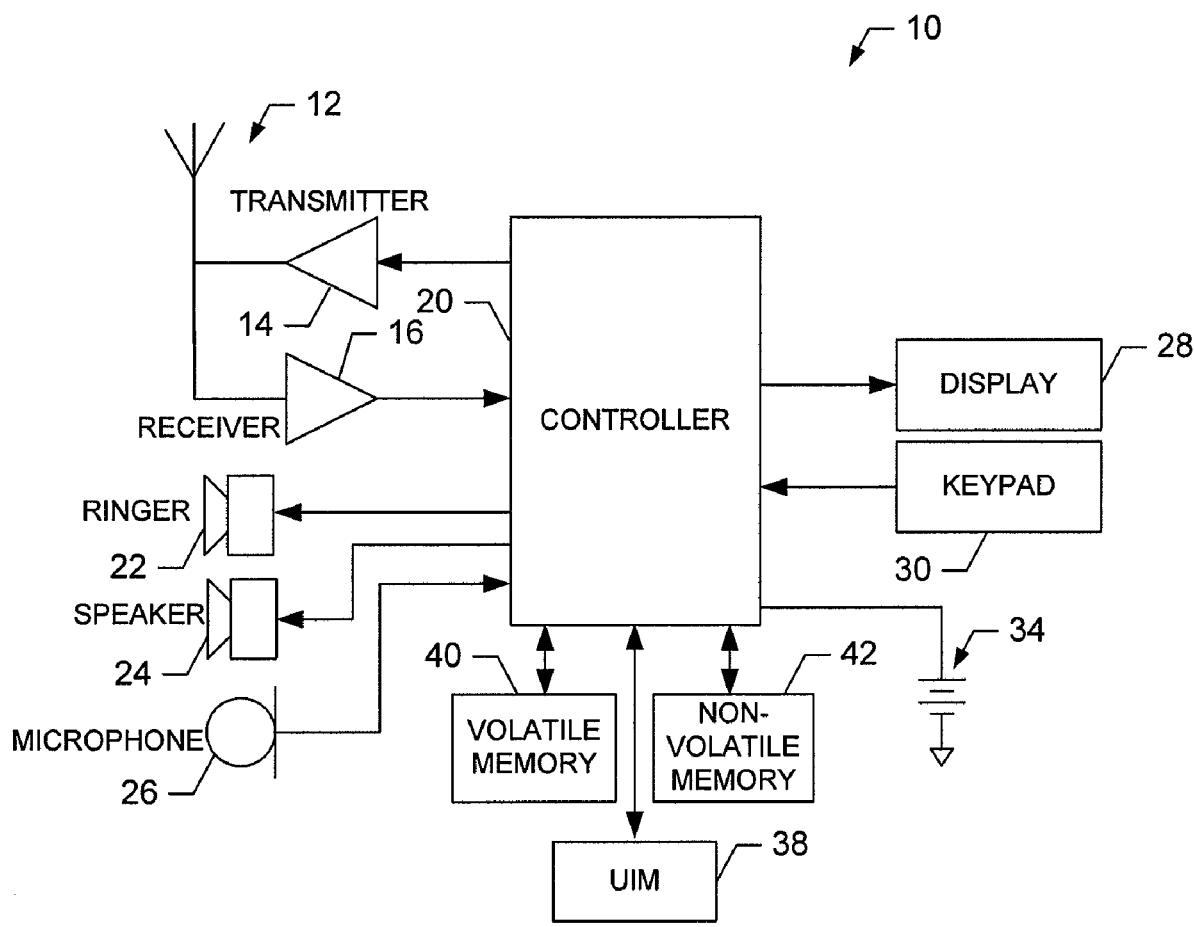
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1, one aspect of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12, or multiple antennae, in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28 that may also be external display e,g, a TV, a monitor or a LCD projector, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity element (UIM) 38. The UIM 38 is typically a memory device having a processor built in. The UIM 38 may include, for example, a subscriber identity element (SIM), a universal integrated circuit card (UICC), a universal subscriber identity element (USIM), a removable user identity element (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
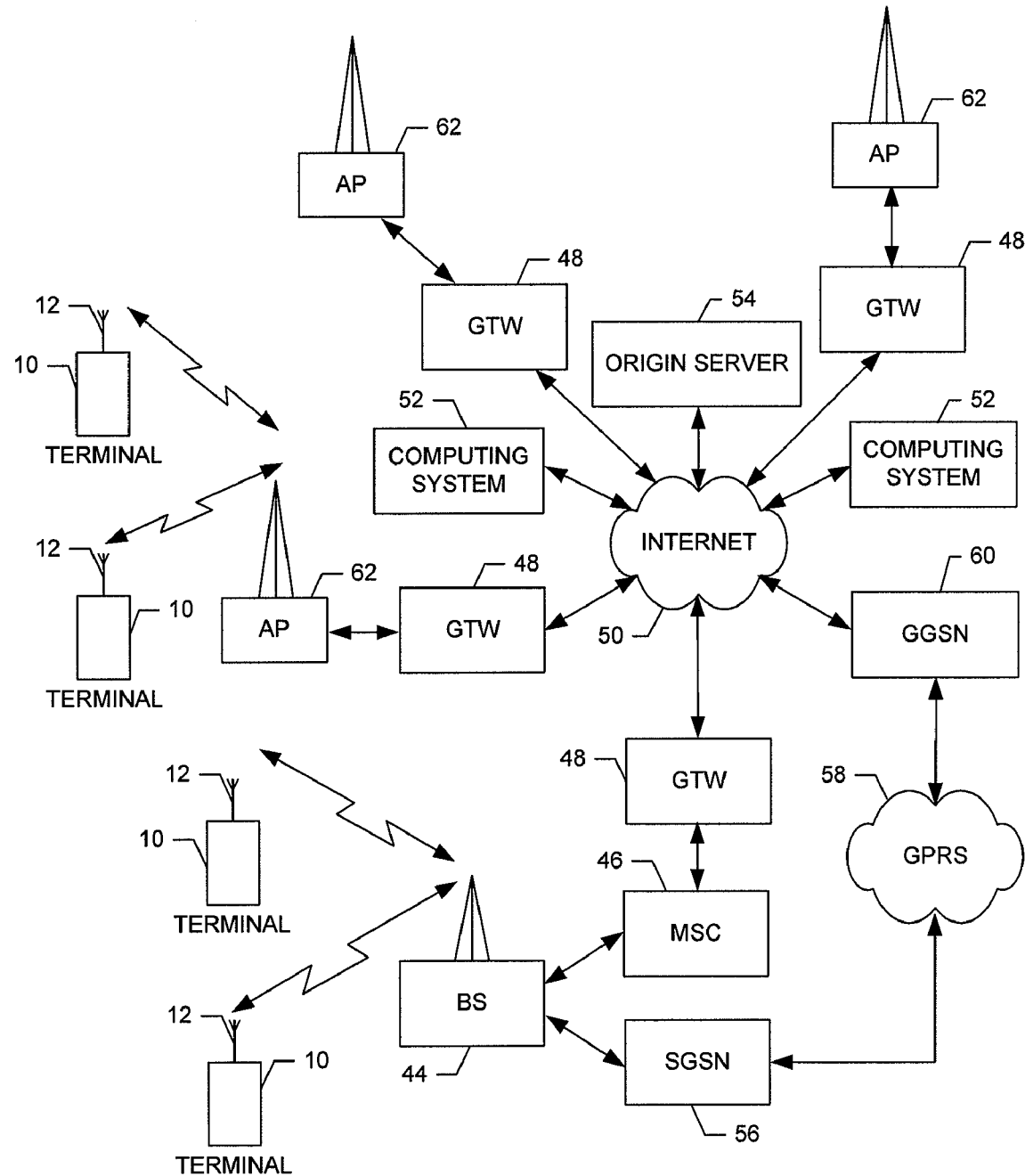
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
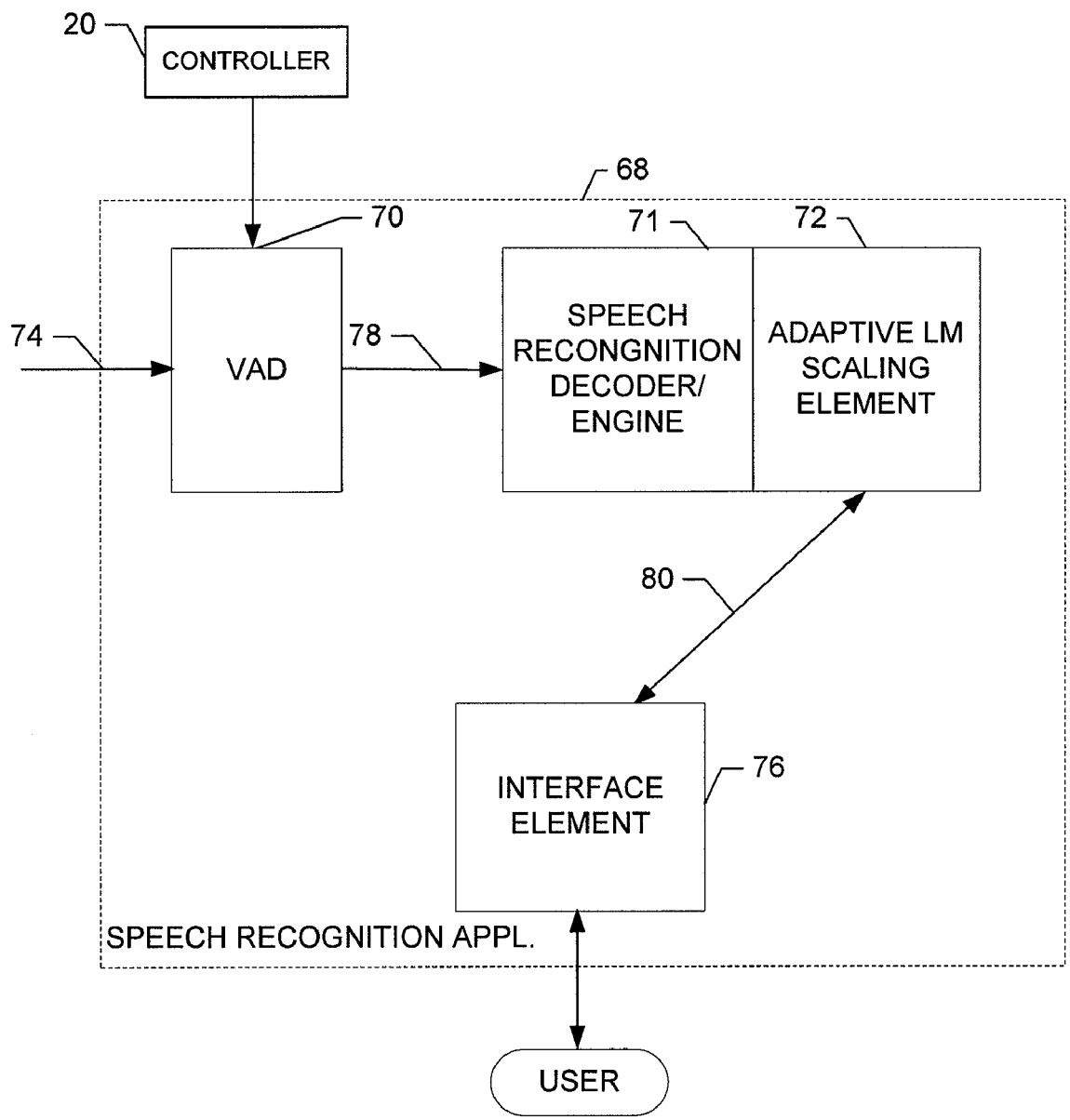
FIG. 3 illustrates a block diagram of portions of a system for providing adaptive language model scaling according to an exemplary embodiment of the present invention.

An exemplary embodiment of the invention will now be described with reference to FIG. 3, in which certain elements of an apparatus for providing adaptive language model scaling are shown in greater detail. The apparatus may be employed, for example, in a speech recognition application. It should be noted, however, that while FIG. 3 illustrates merely one example of a configuration of an apparatus for providing adaptive language model scaling, numerous other configurations may also be used to implement embodiments of the present invention. The apparatus of FIG. 3 may be employed, for example, on the mobile terminal 10 of FIG. 1. However, it should be noted that the apparatus of FIG. 3, may also be employed on a variety of other devices, both mobile and fixed, and therefore, the present invention should not be limited to application on devices such as the mobile terminal 10 of FIG. 1. For example, the apparatus of FIG. 3 may be employed on a personal or handheld computer, a pager, a PDA, a gaming device, a camera, a video recorder, a remote server, etc. As such, although FIG. 3 includes the controller 20 it should be understood that the controller could be any processing element. In this regard, each of the other elements of FIG. 3 may alternatively operate under the control of a corresponding local processing element or a processing element of another device not shown in FIG. 3. A processing element such as those described above may be embodied in many ways. For example, the processing element may be embodied as a processor, a coprocessor, a controller or various other processing means or devices including integrated circuits such as, for example, an ASIC (application specific integrated circuit).

Furthermore, it should be noted that although an exemplary embodiment will be described in detail with respect to an isolated word speech dictation application, which is capable of converting a voice input into a text output, embodiments of the present invention may also be performed in conjunction with other speech recognition applications. As such, the detailed embodiment below is only presented for purposes of example and not of limitation.

Referring now to FIG. 3, an apparatus according to an exemplary embodiment of the present invention includes a voice activity detector (VAD) 70, a speech recognition decoder/engine 71 and an adaptive LM scaling element 72, which operate under the control of a processing element such as the controller 20. As shown in FIG. 3, the VAD 70, the speech recognition decoder/engine 71 and the LM scaling element 72 according to one embodiment may be portions of a speech recognition application 68 that operates under the control of the controller 20. The speech recognition application 68 may also include an interface element 76, which is capable of communicating the output of the adaptive LM scaling element 72 to, for example, a display to allow user interface with regard to the output of the adaptive LM scaling element 72. In an exemplary embodiment, the VAD 70, the speech recognition decoder/engine 71, the adaptive LM scaling element 72 and the interface element 76 may be embodied in the form of software applications executed by the controller 20. As such, instructions for performing the functions of the VAD 70, the adaptive LM scaling element 72 and the interface element 76 may be stored in a memory (for example, either the volatile memory 40 or the non-volatile memory 42) of the mobile terminal 10 and executed by the controller 20.

The VAD 70 may be any device or means embodied in either hardware, software, or a combination of hardware and software that is capable of monitoring signals including voice data and determining whether voice activity is present. For example, in response to receipt of a call, such as a wireless telephone call, the receiver 16 may communicate call data to the VAD 70. The call data may be any type of call including an IP call (for example, VoIP, Internet call, Skype, etc.) or a conference call. The call data may include caller voice data which can be detected by the VAD 70. Additionally, user voice data input into the mobile terminal 10 by, for example, via the microphone 26 may be communicated to the VAD 70 and detected. In response to detection of voice data 74, the VAD 70 may be capable of signaling periods of silence and periods of voice activity in the voice data 74. Accordingly, the VAD 70 may be used to detect and/or indicate word boundaries. For example, if the speech recognition application 68 is an isolated word speech dictation application, the user may be prompted to speak each word with a clear pause between words so that the VAD 70 may detect word boundaries and communicate segmented voice data 78 to the speech recognition decoder/engine 71, which may be any speech recognition decoder/engine known in the art. The speech recognition decoder/engine 71 in turn communicates with the adaptive LM scaling element 72 to enable the adaptive LM scaling element to process the segmented voice data 78. The segmented voice data 78 includes single isolated or segmented words so that recognition of the words at the adaptive LM scaling element 72 may be improved. It should be noted that while speaking with a clear pause between the words enhances the accuracy of the speech recognition application 68 it is also possible to apply the principles disclosed herein to normal speech. However, recognition error rate may be increased in such applications.

The adaptive LM scaling element 72 may be any device or means embodied in either hardware, software, or a combination of hardware and software that is capable of receiving an audio input such as the segmented voice data 78 and converting the segmented voice data 78 to a text output 80 corresponding to the input voice data 74. As stated above, the voice data 74 may be provided to the speech recognition application 68 via the microphone 26. However, the voice data 74 may alternatively be provided by any suitable means such as by playing back recorded voice data or receiving the voice data via a wireless or wireline transmission, etc. The text output 80 may be one or more candidate words or sentences that may be communicated to the user, for example, via a display for confirmation or modification using the interface element 76.

Figure 4:
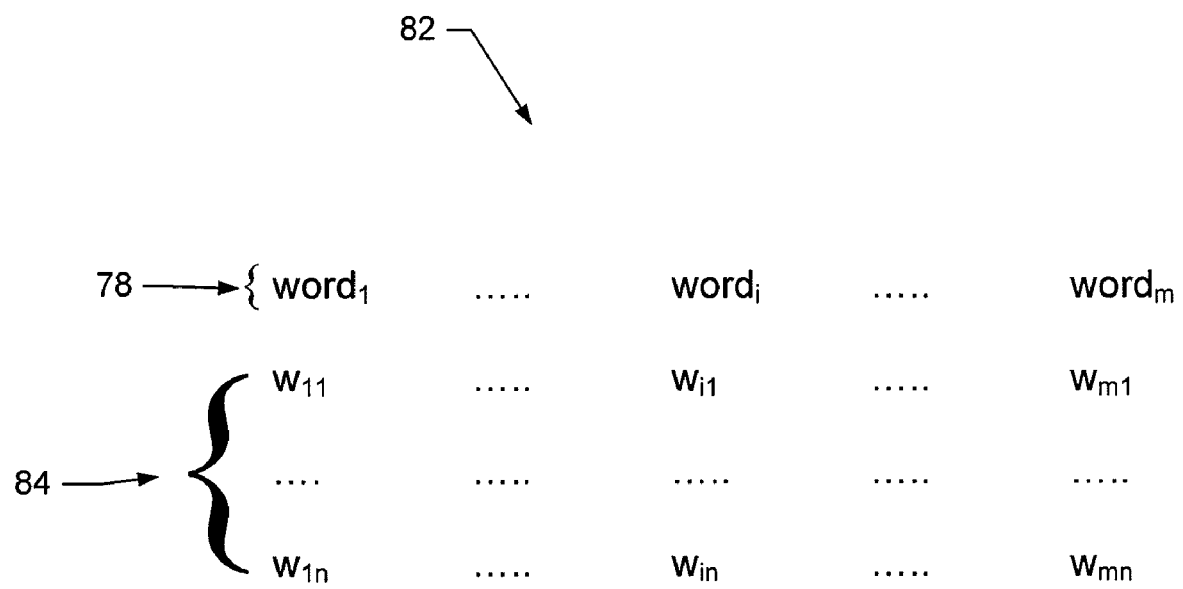
FIG. 4 illustrates a word lattice according to an exemplary embodiment of the present invention.

An exemplary embodiment will now be described in greater detail with reference to FIG. 4, in which a sequence of spoken words such as a particular sentence or phrase is received as the voice data 74, and output by the VAD 70 as the segmented voice data 78 shown in FIG. 4. In this regard, the segmented voice data 78 includes each of the words (word$_1$ to word$_m$) of the sentence or phrase. The adaptive LM scaling element 72 is configured to construct a word lattice 82 from the segmented voice data 78. The word lattice 82 includes candidate words 84 corresponding to each of the words of the sentence or phrase. For example, candidate words $w_{11}$ to $w_{1n}$ correspond to word$_1$, candidate words $w_{i1}$ to $w_{in}$ correspond to word$_i$ and candidate words $w_{m1}$ to $w_{mn}$ correspond to word $_m$. The candidate words 84 of the word lattice 82 may be listed or otherwise organized such that candidates having a highest composite score are listed or otherwise presented first while remaining candidate words are listed or otherwise presented in order of descending composite scores.

The composite score may include an acoustic score and a language score, which may be known as an LM n-gram. As stated above, the acoustic score represents a probability that the word candidate (for example $w_{11}$) matches the corresponding spoken word (for example word$_1$) based only on the sound of the corresponding spoken word. In this regard, the acoustic score may be stored in association with each word or node. Meanwhile, the language score takes into account language attributes such as grammar to determine the probability that a particular word candidate (for example $w_{11}$) matches the spoken word (for example word$_1$) being analyzed based on language probabilities accessible to the application that are associated with each consecutive word pair (for example word$_1$ and word$_2$)). In this regard, the language score is defined for each consecutive word pair, which may also be called an arc or transition. The language score may be calculated based on language probabilities that may be stored in a memory of the mobile terminal 10, or otherwise accessible to a device practicing embodiments of the invention. The composite score may also include LM scaling in order to balance between the acoustic and language scores. In an exemplary embodiment, the LM scaling may be performed by applying a scaling factor $\lambda$ to either or both of the acoustic and language scores. The scaling factor $\lambda$ essentially alters the weighting of the language and/or acoustic scores. For example, if the acoustic score is to be relied upon more than the language score, than the scaling factor $\lambda$ may modify either or both of the acoustic and language scores to achieve a respective scaling or balance. The scaling factor λ of embodiments of the present invention is adaptive, as will be described in greater detail below.

In an exemplary embodiment, the word lattice 82 may be constructed one word at a time. For example, the candidate words 84 corresponding to word$_1$ may be assembled prior to the assembly of the candidate words 84 corresponding to word$_2$. However, the adaptive LM scaling element 72 may also be capable of simultaneous assembly of candidate words 84 for each of the corresponding words. The adaptive LM scaling element 72 may be configured to produce any number of candidate words corresponding to each of the words of the sentence or phrase. For example, the adaptive LM scaling element 72 may be configured to calculate only a top ten or any other selected number of candidate words for each corresponding word or the sentence or phrase. As stated above, the candidate words 84 may be presented, listed, organized, etc. in order of composite score. As such, the candidate words 84 may be ranked in order of the likelihood that each candidate word matches the actual corresponding spoken word based on a balance between both acoustic and language scores. Candidate sentences may then be constructed based on the candidate words 84 by constructing sentences including the candidate words 84. The adaptive LM scaling element 72 may be configured to determine any number of candidate sentences. For example, the adaptive LM scaling element 72 may be configured to determine ten candidate sentences, or N-best sentences ranked according to a summation of the composite scores of the candidate words. The candidate sentences may be organized, listed, presented or otherwise ranked in order of likelihood that the candidate sentence correctly matches the spoken sentence or phrase based on a balance between acoustic and language scores of each of the candidate words of the candidate sentence. In this regard, the candidate sentences may have a corresponding composite score or sentence score. The candidate sentences may then be communicated to the interface element 76 as the output text 80.

The interface element 76 may present the candidate sentences to the user for confirmation, modification or selection via, for example, a display. The presentation of the candidate sentences may be accomplished in a list format, such as by listing a specific number of candidate sentences on a display and enabling the user to select a best or correct one of the candidate sentences. The best or correct one of the candidate sentences should be understood to include the candidate sentence that matches or most closely matches the actual spoken sentence or phrase. In such an embodiment, the user may be presented with a complete list of all candidate sentences or a selected number of candidate sentences in which remaining candidate sentences may be viewed at the option of the user if none of the currently displayed candidate sentences include the best or correct one of the candidate sentences. Alternatively, the user may be presented with a single candidate sentence at any given time, which represents the candidate sentence with the highest composite score that has not yet been viewed by the user. In such an embodiment, the user may again be given the option to view the next most likely candidate sentence if the currently displayed candidate sentence is not the best or correct one of the candidate sentences. In an exemplary embodiment, the user may use the interface element 76 to control attributes of the adaptive LM scaling element 72 such as, for example, the number of candidate sentences to generate, the number of candidate sentences to display, the order in which to display candidate sentences, etc.

As stated in the background section above, striking the correct balance between both acoustic and language scores has typically been done by LM scaling. In this regard, the LM scaling factor λ has conventionally been a fixed value that has been determined heuristically via training data or other experimentation. An example of a mathematical representation of a mechanism by which a best word path or best sentence W* may be calculated is presented below. However, it should be noted that the equations below represent one example of an implementation of embodiments of the present invention and not the only ways to implement embodiments of the present invention. Suppose $a_{ij}$ denotes the acoustic score for word candidate $w_{ij}$ in a logarithmic domain, and $b_{ij}$ stands for the language score (or LM bigram) between the i-th and j-th words in a logarithmic domain. Then the best word path or sentence W* is described by the equation at (1) below:

$$W^* = \arg\max_{W(path)} \sum_{i=1}^{m} (a_{i,path(i)} + \lambda \cdot b_{path(i),path(i+1)}) \quad (1)$$
$$= \arg\max_{W(path)} \left\{ \sum_{i=1}^{m} (a_{i,path(i)}) + \lambda \cdot \sum_{i=1}^{m} (b_{path(i),path(i+1)}) \right\}$$
$$= \arg\max_{W(path)} (SumA(path) + \lambda \cdot SumB(path))$$

where j=path(i) denotes the j-th word candidate at the i-th word segment, and a path indicates a candidate sentence extracted from the word lattice 82.

As stated above, the scaling factor λ is heuristically set as a constant. After candidate sentences (or words) are presented to the user, the user may confirm the correct sentence (or words). Thus, the correct word or word path path* will be known. Sentence scores ($Cum_k$) may be calculated for candidate sentences using, for example, the first of the equations listed at (2) below in which SumA($path_k$) represents the sum of all acoustic scores of candidate words associated with the candidate sentence and SumB($path_k$) represents the sum of all language scores of candidate words associated with the candidate sentence. Meanwhile Cum* of the second equation of the equations listed at (2) represents the sentence score of the actual sentence or phrase.

$Cum_k = SumA(path_k) + \lambda \cdot SumB(path_k)$ k=1,2,...,n $Cum^* = SumA(path^*) + \lambda \cdot SumB(path^*)$ (2)

As shown in the equations above, the sum of all language scores may be multiplied by the scaling factor λ. However, it should be noted that alternatively, the sum of all acoustic scores could be multiplied by the scaling factor λ.

Balancing using a fixed LM scaling factor may create problems if, for example, the environment changes. Examples of changes that may render the fixed LM scaling factor less effective may include a situation in which the test data is significantly different than actual data, high environmental noise levels, different microphone, different speaker, different HMMs or different LMs. Additionally, since experimentation can be time consuming and, in any event, the fixed value resulting may not accurately balance acoustic and language scores in all cases, it may be desirable to instead employ an adaptive LM scaling by making the scaling factor λ a variable value. Accordingly, embodiments of the present invention incorporate the user input received upon selection or confirmation of the correct or best sentence candidate to modify or adapt the scaling factor. Thus, an adaptive scaling factor $\lambda_{new}$ can be adaptively estimated using the user confirmed correct path* and n-best $path_k$, thereby utilizing scaling factor which is indeed adaptive since it is updated during operation. In this regard, the adaptive scaling factor $\lambda_{new}$ may be considered a new scaling factor that is derived from, or in this example the summation of, a previous scaling factor $\lambda_{old}$ and a change in the scaling factor $\Delta\lambda$. As such, the adaptive scaling factor $\lambda_{new}$ may be adaptively updated as $\lambda_{new} = \lambda_{old} + \Delta\lambda$. The first of the equations listed below at (3) represents a sentence score calculation that may be applied to each sentence based on the adaptive scaling factor $\lambda_{new}$. Meanwhile, the second of the equations listed below at (3) represents the sentence score of the sentence that is confirmed or selected by the user as the best or correct sentence.

$$Cum_{k,new} = SumA(path_k) + (\lambda_{old} + \Delta\lambda) \cdot SumB(path_k)$$
$$= Cum_k + \Delta\lambda \cdot SumB(path_k)$$
$$Cum^*_{new} = SumA(path^*) + (\lambda_{old} + \Delta\lambda) \cdot SumB(path^*)$$
$$= Cum^* + \Delta\lambda \cdot SumB(path^*)$$
$$k = 1, 2, \ldots, n$$

(3)

Using the equations above, it may be possible to estimate $\Delta\lambda$ so that LM scaling can be adaptively updated. In order to estimate $\Delta\lambda$, an objective function Q may be defined and optimized. It should be noted that the optimtimization of the objective function Q may be an estimate of an optimal value of the objective function Q. Although optimization of the objective function Q may be performed in numerous ways, one example is shown below at equation (4). In the embodiment shown in equation (4) a reference algorithm for use in defining the objective function Q to be maximized may be expressed as follows:

$$Q = \frac{Cum^*_{new} - \text{mean}(Cum_{new})}{\text{std}(Cum_{new})} \quad (4)$$

In other words, the objective function Q may be maximized by subtracting the mean sentence scores of all sentences calculated using the adaptive scaling factor $\lambda_{new}$ from the sentence score of the user confirmed best sentence and the result may be divided by the standard deviation of the sentence scores of all sentences calculated using the adaptive scaling factor $\lambda_{new}$. It should be noted that a different algorithm may also be used to optimize the objective function Q in which the objective function Q is optimized through minimization instead of maximization as shown above. Additionally, the adaptive scaling factor $\lambda_{new}$ may be updated based on other factors such as, for example, entropy.

In the exemplary embodiment illustrated by equation (4), by maximizing the objective function Q, LM scaling is able to be estimated for updating with each subsequent use of the speech recognition application 68. In other words, the adaptive scaling factor $\lambda_{new}$ can be optimized online with a list or collection of candidate sentences, rather than being optimized only one time via offline experimentation. In operation, for example, a first sentence may be spoken and input into the speech recognition application 68. The VAD 70 may segment the words of the first sentence. The segmented words may then be communicated to the adaptive LM scaling element 72 which constructs the word lattice 82 and then candidate sentences by calculating a sentence score for each sentence using a current adaptive scaling factor. The user is then presented with the candidate sentences, for example, either as a list or one at a time, and the user selects the best or correct sentence from among the candidate sentences. If it is assumed, for the sake of example, that the correct sentence was listed as having the fourth highest sentence score, then the objective function Q may be optimized, for example, using equation (4) above by to improve the score of the candidate sentence that was selected as the correct sentence by determining a value for the change in the adaptive scaling factor. For example, the adaptive scaling factor could be changed in such a way as to increase the rank of the correct sentence from fourth highest sentence score to a higher rank. In this regard, it should be noted that it is not required (and in fact may not be desired) for the adaptive scaling factor to be modified until the correct sentence would have the highest sentence score. Rather, the adaptive scaling factor may simply be modified to incrementally improve the score of the candidate sentence that was selected as the correct sentence. Thus, when the speech recognition application 68 is utilized in association with a second spoken sentence, the second spoken sentence will be processed as above using the current adaptive scaling factor and yet another new adaptive scaling factor will be calculated using the user input regarding the second spoken sentence.

Updating of the adaptive scaling factor may be performed based on only a new sentence or also based on recent sentences. In this regard, recent sentence data may be stored in order to allow use of recent sentences as well as the new sentence in updating of the adaptive scaling factor. Since such an embodiment increases resource consumption, the updating speed of the adaptive scaling factor can be controlled by introducing a forgetting factor. For example, the forgetting factor may set a limit to a time for which sentences are considered recent and therefore stored, or a maximum number of sentences that will be stored as recent sentences. Accordingly, old sentences (defined in terms of time or intervening sentences) may be deleted to reduce resource consumption related to updating of the adaptive scaling factor.

As a result, confirmation information given via the user's interactive feedback may be employed to adaptively update LM scaling via a defined and optimized objective function. Accordingly, recognition performance of a speech recognition application such as the exemplary speech recognition application 68 may be improved without any requirement for experimentation and linguistic knowledge. As indicated above, an exemplary use case for embodiments of the invention is isolated word speech recognition while users have to speak each word with clear pause. However, embodiments of the invention may also be implemented in many other different use cases.

Figure 5:
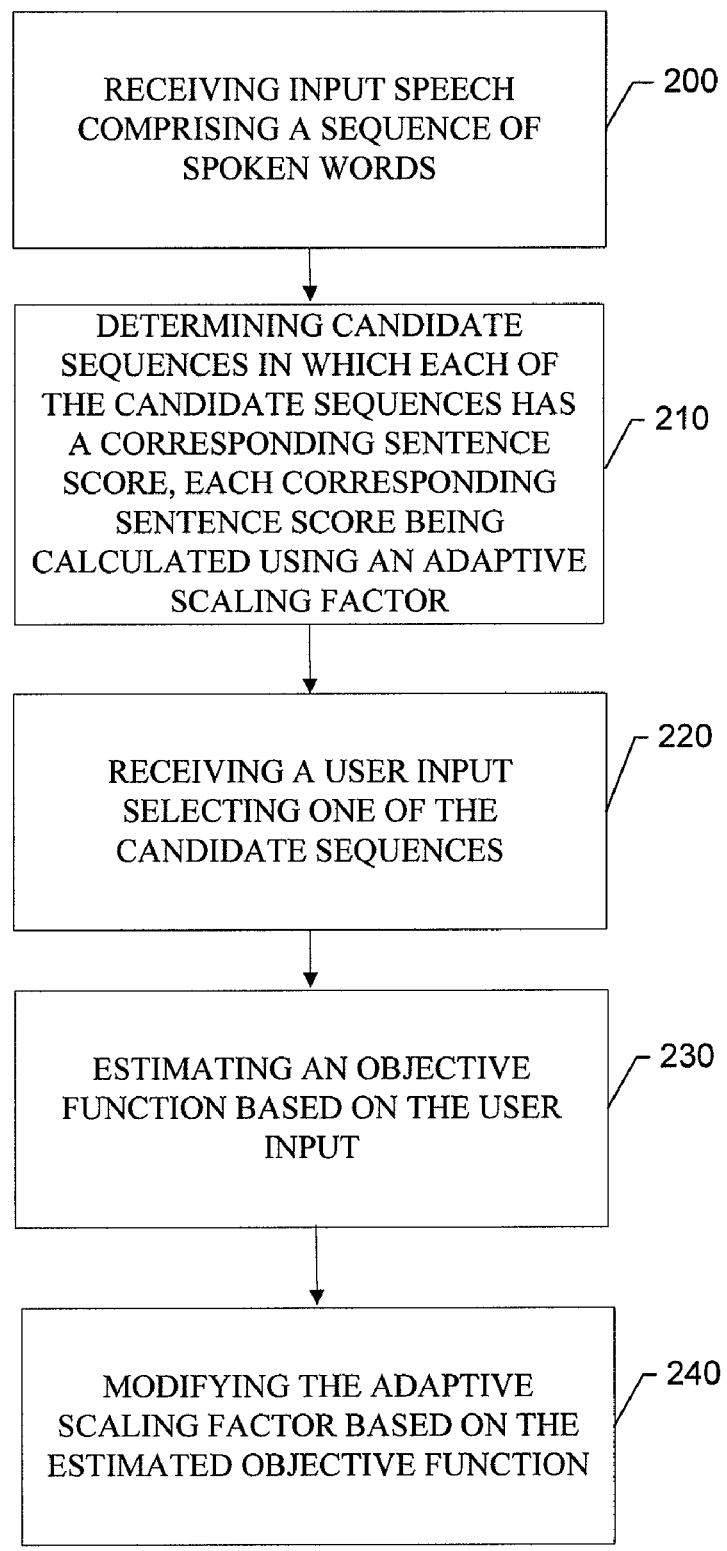
FIG. 5 is a block diagram according to an exemplary method for providing adaptive language model scaling according to an exemplary embodiment of the present invention.

FIG. 5 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing adaptive language model scaling includes receiving input speech comprising a sequence of spoken words (such as a sentence or phrase) at operation 200. At operation 210, a plurality of candidate sequences of text words may be determined in which each of the candidate sequences has a corresponding sentence score representing a probability that a candidate sequence matches the sequence of spoken words. Each corresponding sentence score is calculated using an adaptive scaling factor. In this regard, in one embodiment, the sentence score is calculated by summing an acoustic score and a language score for each candidate sequence, and at least one of the acoustic score or the language score is weighted according to the adaptive scaling factor. A user input selecting one of the candidate sequences is received at operation 220. An objective function is estimated based on the user input at operation 230. In this regard, the objective function may be optimized, or alternatively the estimation of the objective function may represent an estimation of an optimized value for the objective function. The adaptive scaling factor is modified based on the estimated objective function at operation 240. Modifying the adaptive scaling factor may include adjusting the adaptive scaling factor by an amount determined by estimating an optimization or optimizing the objective function. In one embodiment, the adaptive scaling factor is adjusted to at least incrementally improve the sentence score of the user selected one of the candidate sequences.

It should be noted once again that although the preceding exemplary embodiments were described mainly in the context of image related content items, embodiments of the present invention may also be practiced in the context of any other content item. For example, content items may include, but are not limited to images, video files, television broadcast data, text, web pages, web links, audio files, radio broadcast data, broadcast programming guide data, etc. It should also be noted that embodiments of the present invention need not be confined to application on a single device. In other words, some operations of a method according to embodiments of the present invention may be performed on one device, while other operations are performed on a different device. Similarly, one or more of the operations described above may be performed by the combined efforts of means or devices in communication with each other.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving input speech comprising a sequence of spoken words;
determining, via a processor, a plurality of candidate sequences of text words in which each of the candidate sequences has a corresponding sentence score representing a probability that a candidate sequence matches the sequence of spoken words, each corresponding sentence score being calculated using an adaptive scaling factor that applies weights to respective components of word scores used to determine the corresponding sentence score;
receiving a user input selecting one of the candidate sequences;
estimating an objective function based on the user input, the objective function defining a difference value to be applied to the adaptive scaling factor based on the user input to improve a sentence score of the user selected one of the candidate sequences; and
modifying the adaptive scaling factor by adjusting the adaptive scaling factor by an amount determined by the estimated objective function.

2. A method according to claim 1, further comprising generating a word lattice including a series of candidate words corresponding to each of the spoken words in the sequence of spoken words, each of the candidate words having a corresponding word score.

3. A method according to claim 2, further comprising determining the word score of each of the candidate words by summing an acoustic score and a language score for each word, wherein at least one of the acoustic score or the language score is weighted according to the adaptive scaling factor.

4. A method according to claim 3, wherein determining the plurality of candidate sequences of text words comprises determining each of the candidate sequences responsive to a summation of selected word candidates.

5. A method according to claim 1, further comprising calculating the sentence score by summing an acoustic score and a language score for each candidate sequence, and wherein at least one of the acoustic score or the language score is weighted according to the adaptive scaling factor.

6. A method according to claim 1, wherein estimating the objective function is performed based on the user input and a collection of recently used candidate sequences.

7. A method according to claim 6, further comprising applying a forgetting factor to define the collection of recently used candidate sequences.

8. A method according to claim 7, wherein applying the forgetting factor comprises one of:
defining the collection based on age of recently used sentences; or
defining the collection to be a predetermined number of recently used sentences.

9. A computer program product comprising at least one computer-readable storage medium having computer-readable program code portions stored therein, the computer-readable program code portions comprising:
a first executable portion for receiving input speech comprising a sequence of spoken words;
a second executable portion for determining a plurality of candidate sequences of text words in which each of the candidate sequences has a corresponding sentence score representing a probability that a candidate sequence matches the sequence of spoken words, each corresponding sentence score being calculated using an adaptive scaling factor that applies weights to respective components of word scores used to determine the corresponding sentence score;
a third executable portion for receiving a user input selecting one of the candidate sequences;
a fourth executable portion for estimating an objective function based on the user input, the objective function defining a difference value to be applied to the adaptive scaling factor based on the user input to improve a sentence score of the user selected one of the candidate sequences; and
a fifth executable portion for modifying the adaptive scaling factor by adjusting the adaptive scaling factor by an amount determined by the estimated objective function.

10. A computer program product according to claim 9, further comprising a sixth executable portion for generating a word lattice including a series of candidate words corresponding to each of the spoken words in the sequence of spoken words, each of the candidate words having a corresponding word score.

11. A computer program product according to claim 10, further comprising a seventh executable portion for determining the word score of each of the candidate words by summing an acoustic score and a language score for each word, wherein at least one of the acoustic score or the language score is weighted according to the adaptive scaling factor.

12. A computer program product according to claim 11, wherein the second executable portion includes instructions for determining each of the candidate sequences responsive to a summation of selected word candidates.

13. A computer program product according to claim 9, further comprising a sixth executable portion for calculating the sentence score by summing an acoustic score and a language score for each candidate sequence, and wherein at least one of the acoustic score or the language score is weighted according to the adaptive scaling factor.

14. A computer program product according to claim 9, wherein the fourth executable portion is executed based on the user input and a collection of recently used candidate sequences.

15. A computer program product according to claim 14, further comprising a sixth executable portion for applying a forgetting factor to define the collection of recently used candidate sequences.

16. A computer program product according to claim 15, wherein the sixth executable portion includes instructions for one of:
defining the collection based on age of recently used sentences; or
defining the collection to be a predetermined number of recently used sentences.

17. An apparatus comprising a processor and memory including computer program code, the memory and the computer program code configured to, with the processor, cause the apparatus to at least:
receive input speech comprising a sequence of spoken words;
determine a plurality of candidate sequences of text words in which each of the candidate sequences has a corresponding sentence score representing a probability that a candidate sequence matches the sequence of spoken words, each corresponding sentence score being calculated using an adaptive scaling factor that applies weights to respective components of word scores used to determine the corresponding sentence score;
receive a user input selecting one of the candidate sequences,
estimate an objective function based on the user input, the objective function defining a difference value to be applied to the adaptive scaling factor based on the user input to improve a sentence score of the user selected one of the candidate sequences; and
modify the adaptive scaling factor by adjusting the adaptive scaling factor by an amount determined by the estimated objective function.

18. An apparatus according to claim 17, wherein the memory and the computer program code are configured to, with the processor, cause the apparatus to generate a word lattice including a series of candidate words corresponding to each of the spoken words in the sequence of spoken words, each of the candidate words having a corresponding word score.

19. An apparatus according to claim 18, wherein the memory and the computer program code are configured to, with the processor, cause the apparatus to determine the word score of each of the candidate words by summing an acoustic score and a language score for each word, wherein at least one of the acoustic score or the language score is weighted according to the adaptive scaling factor.

20. An apparatus according to claim 19, wherein the adaptive memory and the computer program code are configured to, with the processor, cause the apparatus to determine each of the candidate sequences responsive to a summation of selected word candidates.

21. An apparatus according to claim 17, wherein the memory and the computer program code are configured to, with the processor, cause the apparatus to calculate the sentence score by summing an acoustic score and a language score for each candidate sequence, and wherein at least one of the acoustic score or the language score is weighted according to the adaptive scaling factor.

22. An apparatus according to claim 17, wherein the memory and the computer program code are configured to, with the processor, cause the apparatus to estimate the objective function based on the user input and a collection of recently used candidate sequences.

23. An apparatus according to claim 22, wherein the memory and the computer program code are configured to, with the processor, cause the apparatus to apply a forgetting factor to define the collection of recently used candidate sequences.

24. An apparatus according to claim 23, wherein the memory and the computer program code are configured to, with the processor, cause the apparatus to perform one of:
   defining the collection based on age of recently used sentences; or
   defining the collection to be a predetermined number of recently used sentences.

25. An apparatus according to claim 17, wherein the apparatus is embodied as a mobile terminal.

26. An apparatus comprising:
   means for receiving input speech comprising a sequence of spoken words;
   means for determining a plurality of candidate sequences of text words in which each of the candidate sequences has a corresponding sentence score representing a probability that a candidate sequence matches the sequence of spoken words, each corresponding sentence score being calculated using an adaptive scaling factor that applies weights to respective components of word scores used to determine the corresponding sentence score;
   means for receiving a user input selecting one of the candidate sequences;
   means for estimating an objective function based on the user input, the objective function defining a difference value to be applied to the adaptive scaling factor based on the user input to improve a sentence score of the user selected one of the candidate sequences; and
   means for modifying the adaptive scaling factor by adjusting the adaptive scaling factor by an amount determined by the estimated objective function.

* * * * *